United States Patent [19]

Ishiharada et al.

[11] Patent Number: 4,830,461
[45] Date of Patent: May 16, 1989

[54] PRESSURE-SENSITIVE SENSORS

[75] Inventors: Minoru Ishiharada, Kodaira; Toshio Chikaraishi, Akishima; Hiroshi Kaneda, Kodaira; Seisuke Tomita, Tokorozawa, all of Japan

[73] Assignee: Bridgestone Corporation, Tokyo, Japan

[21] Appl. No.: 146,547

[22] Filed: Jan. 21, 1988

[30] Foreign Application Priority Data

Jan. 29, 1987 [JP] Japan ............................ 62-17377
Jan. 30, 1987 [JP] Japan ............................ 62-18719
Feb. 19, 1987 [JP] Japan ............................ 62-34650
Mar. 5, 1987 [JP] Japan ............................ 62-48910
Mar. 6, 1987 [JP] Japan ............................ 62-50388

[51] Int. Cl.⁴ ........................ G02B 6/02; G02B 6/10
[52] U.S. Cl. ........................... 350/96.29; 350/96.34
[58] Field of Search ............... 350/96.29, 96.30, 96.34

[56] References Cited

U.S. PATENT DOCUMENTS 4,756,600  7/1988  Ramsay et al. ............... 350/96.34

Primary Examiner—William L. Sikes
Assistant Examiner—Robert E. Wise
Attorney, Agent, or Firm—Sughrue, Mion, Zinn, Macpeak & Seas

[57] ABSTRACT

A pressure-sensitive sensor comprises an optical wave guide consisting of a core and a clad, and a light emitting means and a light receiving means each connected to the optical wave guide. The core is made from a transparent material having a refractive index somewhat larger than that of a material constituting the clad and selected from chloroprene rubber, urethane rubber silicone rubber, fluorine rubber, acrylic rubber, ethylene-propylene rubber, ethylene-propylene-diene terpolymer rubber and epichlorohydrin rubber.

6 Claims, 13 Drawing Sheets

FIG_1a
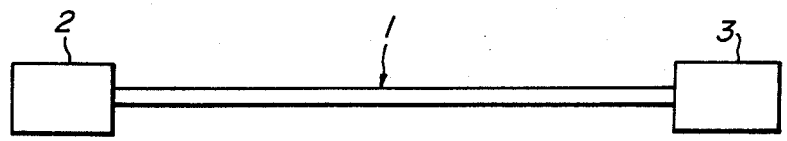
FIG_1b
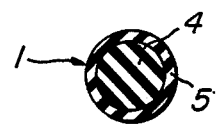
FIG_2
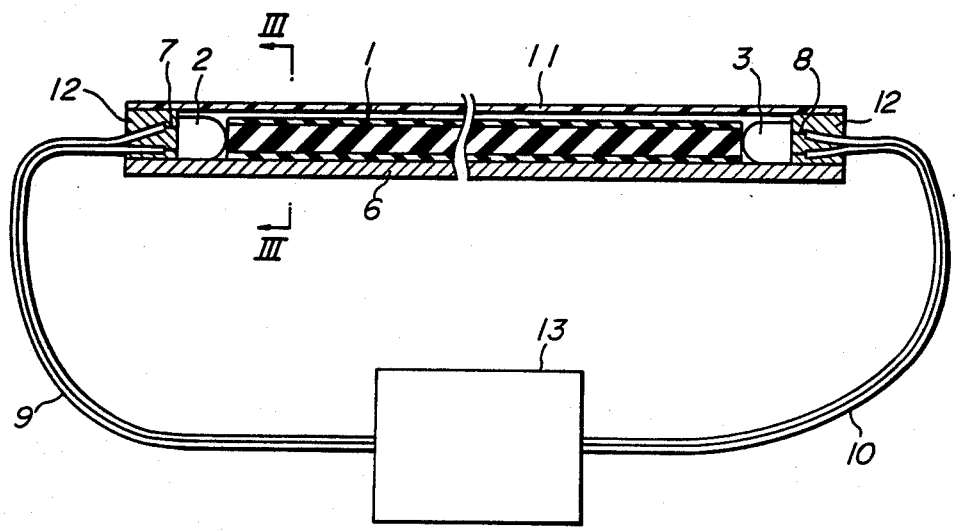

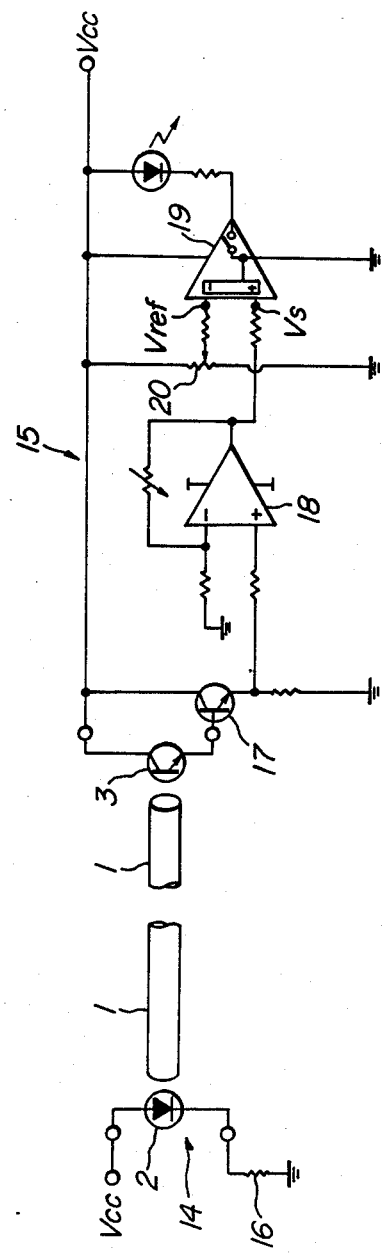

FIG._5
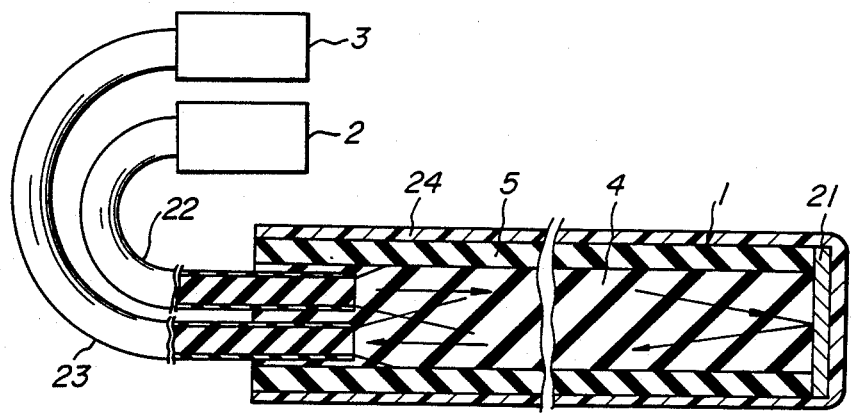
FIG._6
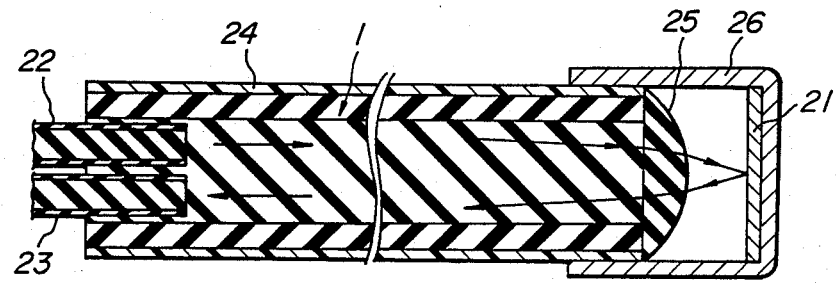

FIG._7a
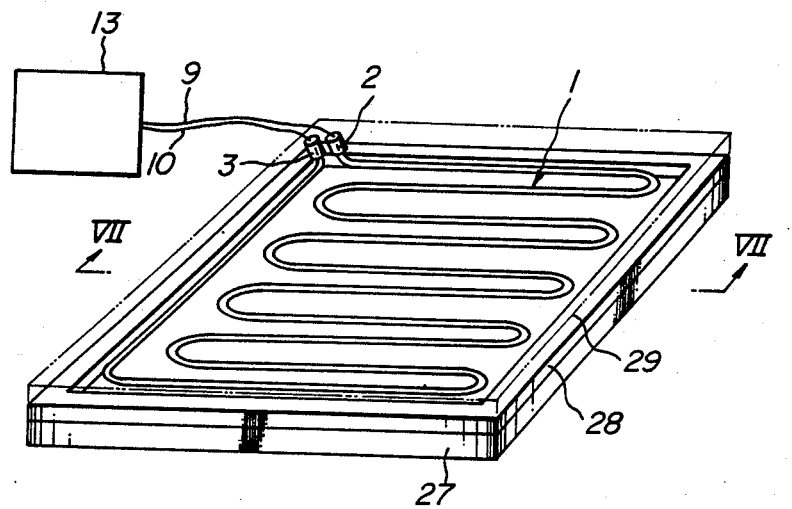
FIG._7b
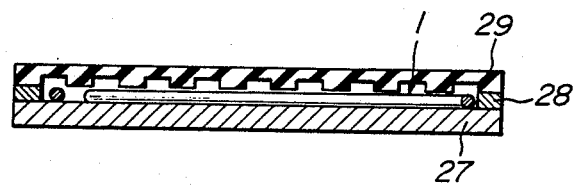

FIG_9a
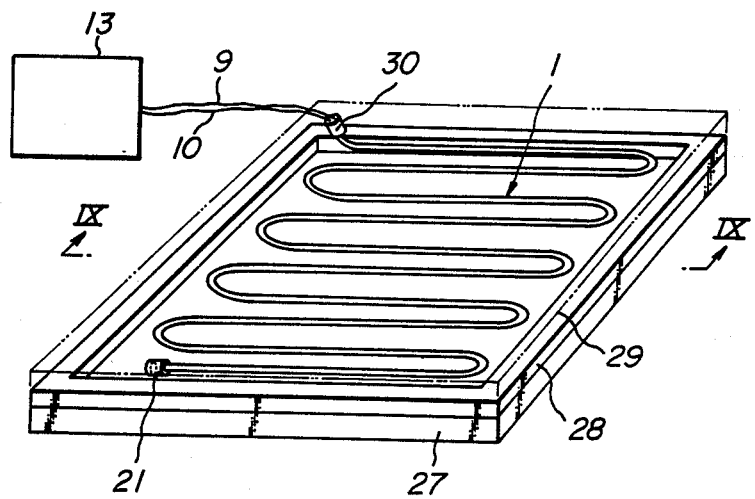
FIG_9b
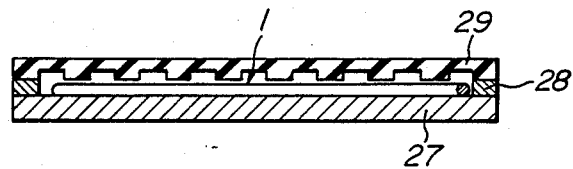

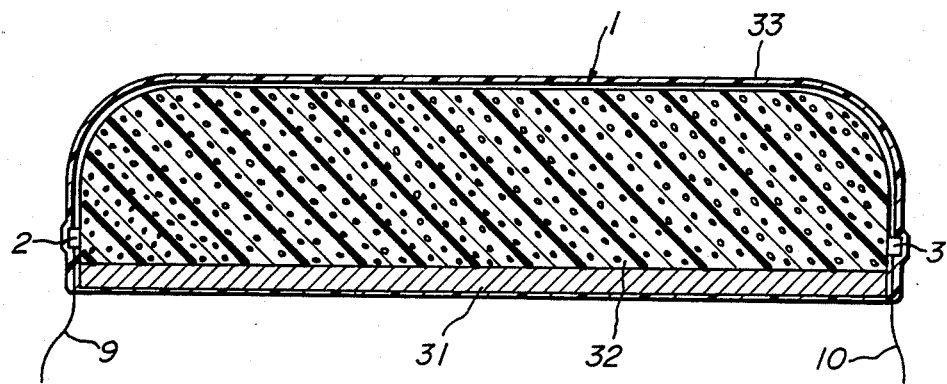
FIG_10
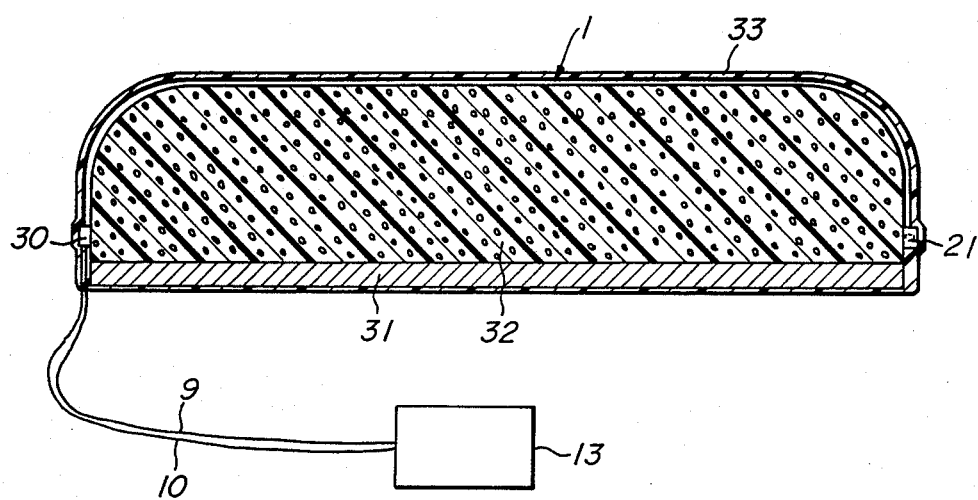
FIG_11

FIG_15a  FIG_15b  FIG_15c
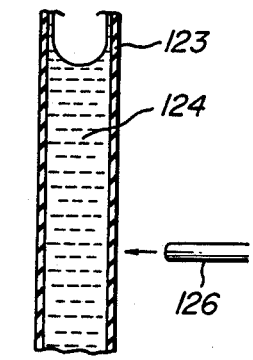
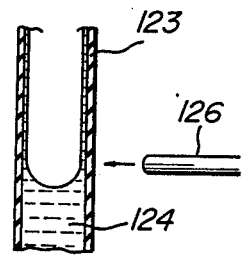
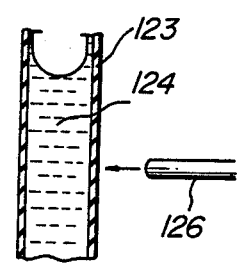

PRESSURE-SENSITIVE SENSORS

BACKGROUND OF THE INVENTION

1. Field of the Invention

This invention relates to a pressure-sensitive sensor capable of detecting an action of external force at a high sensitivity through an elastic deformation of an optical wave guide and having excellent heat resistance and impact resistance. Furthermore, it relates to a method of producing an optical wave guide used for such a pressure-sensitive sensor, and more particularly to a method of producing an optical wave guide having sufficiently improved optical transmission properties with preventing ray scattering loss and others at a boundary portion between core and clad.

2. Related Art Statement

In order to detect the presence or absence of external force or a magnitude thereof, there has hitherto been known a pressure-sensitive sensor as disclosed in Japanese Patent laid open No. 55-133,709, wherein a pair of electrodes are closely arranged on opposite surfaces of pressure conductive rubber to form a contact mechanism and a lead wire is connected to each of the electrodes and the contact mechanism is airtightly covered with an insulative coating to thereby form a tape-like pressure-sensitive sensor.

In general, the tape-like pressure-sensitive sensor serves to operate on-off control of motor or the like connected to a switching circuit when an electric resistance value of the pressure conductive rubber gradually decreases and reaches below a given value as the external force acting to the pressure conductive rubber increases.

In this pressure-sensitive sensor, however, there are problems that when the pressure conductive rubber is subjected to a repetitive deformation such as compression, bending, torsion or the like, metallic powder and other conductive particles dispersedly incorporated in the inside of the pressure conductive rubber fall down from the rubber at a relatively early time and also the electrode made of metal plate, metal thin sheet, conductive film, deposition film or the like suffers premature breakage or other injury through the repetitive deformation.

Further, when the breaking of the lead wire or the other trouble is caused in the pressure-sensitive sensor viewing from its structure, or when a power supply is accidentally stopped, even if the external force is actually applied to the pressure-sensitive sensor, the signal of detecting the external force can not be output, so that when such a pressure-sensitive sensor is used in a robot or other safety device, there is a problem of causing a serious accident. That is, when the pressure-sensitive sensor is used as a safety device, if abnormal situation is caused, the safety device is required to actuate toward a side of guaranteeing safety or warn self abnormal state. In this case, however, the conventional pressure-sensitive sensor is at a similar state as in the case of inaction of external force even if the external force acts to the sensor, so that the function as a safety device can not sufficiently be developed.

In order to solve these problems, Japanese Patent laid open No. 61-34,493 proposed a pressure-sensitive sensor comprising a flexible optical fiber, a light emitting means for introducing a light into the optical fiber and a light receiving means for receiving a light transmitted inside the optical fiber and converting a voltage signal proportioned to a light receiving quantity into a binary code as compare with a threshold value, which detects such a feature that the optical fiber is curved at a contact state with an object by the increase of optical loss.

Since such a sensor is an optical sensor, it is not necessary to perform the dispersion mixing of conductive particles or adhesion of electrode, so that there is no fear of causing the former problems described in the pressure-sensitive sensor using the pressure conductive rubber. Furthermore, in case of occurrence of abnormal situation such as trouble of sensor or accidental power supplying stop, the quantity of light arrived at the receiving means decreases or disappears likewise the case of acting the external force to the sensor, so that when this sensor is used as a safety device, the safety can sufficiently be ensured in the occurrence of abnormal situation.

However, the pressure-sensitive sensor as an optical sensor uses a quartz fiber, multi-component glass series fiber or plastic fiber as an optical fiber. Although this optical fiber has a flexibility, the rigidity becomes too high and hence the freedom degree of deformation in the fiber is low, so that it is impossible to produce deformations such as a large compression deformation in a direction perpendicular to the axial line, a partially large bending deformation and the like.

Therefore, there are the following problems:

(1) Even when the external force is applied to the pressure-sensitive sensor, the deformation amount of the sensor and hence the radiation loss is small, and consequently the sensitivity of the sensor is very low;

(2) When the sensor is excessively deformed, the breaking, plastic deformation and the like of the optical fiber occur; and (3) Since the optical fiber is not substantially subjected to elongation deformation, in case of bending deformation of the pressure-sensitive sensor, the peeling of the optical fiber from the light emitting or receiving means is caused due to a large component of force in a tensile direction.

Particularly, when using the optical fiber made of a plastic fiber, the softening point of the plastic fiber is within a range of 80°~125° C., so that it is impossible to apply the pressure-sensitive sensor to a place exposed to a high temperature above 80° C. On the other hand, the glass transition temperature of the plastic fiber is usually about room temperature and hence the properties of the plastic fiber rapidly degrade at a temperature below room temperature, so that there is a problem that the lower limit of use temperature of the pressure-sensitive sensor is considerably restricted.

SUMMARY OF THE INVENTION

It is, therefore, an object of the invention to advantageously solve the aforementioned problems of the conventional techniques and to provide a pressure-sensitive sensor having improved heat resistance and impact resistance which can considerably enhance a sensitivity of detecting external force by enabling th optical wave guide to sufficiently large compression deformation in a direction crossing to the axial line and a partially large bending deformation without causing problems inherent to the pressure-sensitive sensor using the pressure conductive rubber, surely prevent the breakage, plastic deformation and the like of the optical wave guide, and sufficiently prevent the peeling of the optical wave guide from the light emitting or receiving means.

The pressure-sensitive sensor according to the invention comprises an optical wave guide constructed with a core of an elastic material and a clad, and a light emitting means and a light receiving means each connected to the optical wave guide, the core having a refractive index somewhat larger than that of the clad and a light permeability being made from a synthetic rubber selected from chloroprene rubber, urethane rubber, silicone rubber, fluorine rubber, acrylic rubber, ethylene-propylene rubber, ethylene-propylenediene terpolymer rubber and epichlorohydrin rubber.

DETAILED DESCRIPTION OF THE INVENTION

According to the invention, when the external force is directly or indirectly applied to the pressure-sensitive sensor, the elastic deformation such as compression deformation, bending deformation or the like is caused in the optical wave guide, so that a part of a light incident from the light emitting means to the optical wave guide intrudes from the core into the clad at a plastic deformed portion and is radiated toward the outside and consequently a light quantity arriving at the light receiving means is reduced. In the sensor according to the invention, therefore, a voltage signal corresponding to the light received quantity is detected by the light receiving means, whereby the magnitude of the external force can quantitatively be sensed under an excellent sensitivity, and also the voltage signal is binalized in comparison with the threshold value to bring about the switching action to the external force larger than the particular value.

Since the optical wave guide is constructed with the core of elastic material and the clad, it can be subjected to a large compression deformation in a direction crossing to the axial line and to a partially large bending deformation, so that the presence and magnitude of the external force acting to the pressure-sensitive sensor can be detected remarkably sensitively. Furthermore, even when the sensor is excessively curved, there is no fear of causing the breakage, plastic deformation and the like in the optical wave guide. For instance, when the pressure-sensitive sensor is largely deformed, if a relatively large component of force is applied to the sensor in the tensile direction, since the sensor can be largely elongated, the accidental peeling of the optical wave guide from the light emitting or receiving means can sufficiently be prevented.

Moreover, since the core is made of the synthetic rubber, the optical properties and mechanical properties of the optical wave guide can usually and sufficiently be stabilized over a wide temperature range from a high temperature above 100° C. to lower than a freezing point and the impact resistance can be enhanced.

The use of natural rubber, butadiene rubber, isoprene rubber or the like as a core material is eliminated because the heat resistance and transparency are low due to the presence of double bond.

It is known that the flexible optical wave guide consisting of a core made from a transparent rubbery elastomer having a high refractive index and a clad made from a rubbery elastomer having a low refractive index, which is used in the pressure-sensitive sensor according to the invention, is produced, for example, by a method as disclosed in Japanese Patent laid open No. 61-259,202.

In this conventional method, a liquid polymer for the formation of the core and a liquid polymer for the formation of the clad are fallen downward from a concentrated nozzle as an inner layer and an outer layer, respectively, during which these polymers are simultaneously cured through an irradiation of a radiation or ultraviolet ray or by heating. Thus, there is obtained an elongated optical elastomer fiber, at least core of which has rubbery elastic properties.

According to the conventional method, the liquid polymer for the core and the liquid polymer for the clad are coextruded from the concentrated nozzle, so that these polymers are mixed with each other during the falling to unidentify the boundary face between the core and the clad and the exact control of the final diameter is substantially impossible. Furthermore, the falling speeds of both the liquid polymers become faster under an influence of gravity acting to the polymers, so that the simultaneous and rapid curing of these polymers is necessary to be carried out at a high temperature, but when performing the high temperature curing, the heat degradation is caused in the core and clad and also the unhomogeneous curing of the core results from the large difference in the temperature between the inner and outer portions in radial direction, whereby the optical fiber having an excellent transparency can not be produced.

When the viscosities of both the polymers to be coextruded are increased, unevenness in circumferential direction resulted from the surface roughness of the nozzle as well as unevenness in lengthwise direction resulted from the change of extrusion rate are produced in the boundary face between both the polymers. Such unevennesses bring about the occurrence of radiant wave of the ray transmitted inside the core to the interior of the clad and the conversion of mode, so that the bonding phenomenon between modes is caused due to scattering loss and mode conversion to increase optical transmission loss.

Therefore, it is a further object of the invention to advantageously solve the problems of the conventional method and to provide a method of producing an optical wave guide which can sufficiently prevent the mixing of the core material and the clad material and control the final diameter, and further can prevent the heat degradation of core and clad and enhance the transparency of the core, and optically and sufficiently make the boundary face between the core material and the clad material, exactly the boundary face between the coating material formed outside the core material and the clad material smooth to effectively prevent the occurrence of radiant wave to the clad, mode conversion and the like and sufficiently improve optical transmission properties.

According to a second aspect of the invention, there is the provision of a method of producing a flexible optical wave guide, which comprises extruding a high viscosity transparent core material through a nozzle, applying a low viscosity transparent liquid coating material to the periphery of the transparent core material by a proper process such as dipping, spraying, brushing or the like before or after the curing of the core material, curing the transparent core material and the transparent coating material, or only the transparent coating material by heating, applying a liquid clad material to the periphery of the transparent coating material by the same process as mentioned above, and then curing the clad material through an irradiation of an ultraviolet ray, a radiation or an electron beam or by heating.

According to the method of the invention, only the core material is extruded from the nozzle and heated and cured before the application of the clad material, so that the core material is never mixed with the clad material. Further, the core material has a high viscosity and is cured at a early time, so that the control of core diameter is very easy. Moreover, the high viscosity core material does not substantially elongate under an influence of the dead weight, so that the curing of the core material can slowly be carried out at a relatively low temperature and consequently the heat degradation of the core is prevented and further sufficiently homogeneous curing can be carried out as a whole in radial direction. Such a low temperature curing can be applied to the clad material, whereby the heat degradation of the clad material can sufficiently be prevented.

In addition, the low viscosity transparent coating material is applied to the periphery of the high viscosity transparent core material after the extrusion of the core material from the nozzle, whereby the unevennesses in circumferential and lengthwise directions produced on the periphery of the core material can completely be covered with the transparent coating material. Further, just after the application of the transparent coating material to the core material, the coating material is cured alone or together with the core material, whereby the falling, sagging or the like of the low viscosity transparent coating material can be prevented to sufficiently make the outer peripheral surface smooth and simultaneously provide a strong adhesion to the core material.

In the preferred method, the unevennesses on the peripheral surface of the core material can completely be covered with the transparent coating material having a refractive index equal to that of the core material and at the same time, the surface of the coating material to be adhered to the clad material may be an optically smooth face.

Furthermore, the clad material is applied and adhered to the peripheral surface of the transparent coating material, so that the occurrence of unevenness of the clad material, particularly at its inner peripheral surface is surely prevented and also the boundary face between the clad material and the coating material may be a smooth surface in accordance with the smoothness degree of the transparent coating material.

In the flexible optical wave guide produced by this method, the boundary face between the transparent coating material and the clad material is sufficiently clear and smooth, so that the radiation of the ray, mode conversion and the like are effectively prevented at this boundary face to sufficiently enhance optical transmission properties.

BRIEF DESCRIPTION OF THE DRAWINGS

The invention will be described with reference to the accompanying drawings, wherein:

FIG. 1 is a schematic view of an embodiment of the pressure-sensitive sensor according to the invention;

FIG. 2 is a schematic view partly shown in section of another embodiment of the pressure-sensitive sensor according to the invention;

FIG. 4 is a circuit diagrams in a detecting device;

FIGS. 5 and 6 are lengthwisely sectional views of third and fourth embodiments of the pressure-sensitive sensor according to the invention, respectively;

FIGS. 7a and 7b are a perspective view and a sectional view of an embodiment of applying the pressure-sensitive sensor according to the invention to a mat switch, respectively;

FIGS. 9a and 9b are a perspective view and a sectional view of another embodiment of the mat switch;

FIGS. 10 and 11 are sectional views of embodiments of applying the pressure-sensitive sensor according to the invention to a bumper, respectively;

FIGS. 15a to 15c are partial enlarge section views of a main part of the apparatus shown in FIG. 14 at various states, respectively.

In FIG. 1 is shown a first embodiment of the pressure-sensitive sensor according to the invention, wherein numeral 1 is an optical wave guide, and numerals 2 and 3 a light emitting means and a light receiving means optically connected to both ends of the optical wave guide 1.

Figure 3A:
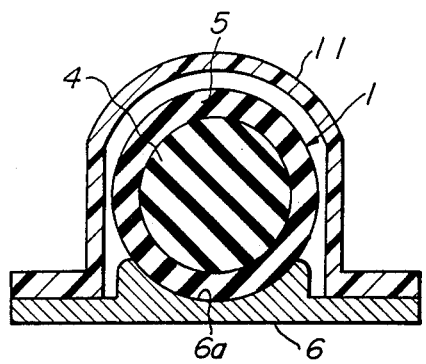
FIGS. 3a to 3c are transversely sectional views of the sensor taken along a line III—III at various states, respectively.

The optical wave guide 1 is constructed with a solid core 4 made from a rubbery elastic material having high light permeability and refractive index and a clad 5 made from a rubbery elastic material having a refractive index lower than that of the core 4 and covering the periphery of the core 4. Particularly, the core 4 is made of a synthetic rubber properly selected from the group consisting of chloroprene rubber, urethane rubber, silicone rubber, fluorine rubber, acrylic rubber, ethylene-propylene rubber, ethylene-propylene-diene terpolymer rubber and epichlorohydrin rubber, while the clad 5 is made of natural rubber or a synthetic rubber properly selected from the group consisting of chloroprene rubber, butadiene rubber, isoprene rubber, urethane rubber, silicone rubber, fluorine rubber, acrylic rubber, ethylene-propylene rubber, ethylene-propylene-diene terpolymer rubber and epichlorohydrin rubber.

Preferably, the core material is a silicone rubber, i.e. polyorganosiloxane having a phenyl group, an alkyl group such as ethyl group, propyl group, butyl group, amyl group, hexyl group, octyl group or decyl group, a phenetyl group, a naphthyl group, a naphthalene ethyl group or the like in its side chain. As the clad material, there are preferably used polydimethylsiloxane, fluorine containing polyorganosiloxane such as polymethyltrifluoropropyl siloxane, polymethyltetrahydroperfluorooctyl siloxane or the like, or polyorganosiloxane having a small content of a phenyl group or an alkyl group such as ethyl group or the like.

Particularly, methylphenyl polysiloxane or dimethyldiphenyl polysiloxane having a phenyl group content of 5~40%, preferably 5~30%, more particularly 8~25% and a refractive index of 1.42~1.54, preferably 1.425~1.52, more particularly 1.44~1.50 is preferable as a core material and dimethyl polysiloxane having a refractive index of 1.40 is preferable as a clad material because they are easily available and heap.

When the curing mechanism of the core material is an addition reaction type, the amount of a curing catalyst used becomes slight and a reaction by-product is not produced, so that a very excellent light permeability can be obtained.

Particularly, when an addition reaction type silicone rubber is used as a core material and a silicone rubber is used as a clad material, it is desirable that an amount of platinum as a curing catalyst for the silicone rubber for the core is as slight as $0.005\times10^{-4}$~$0.1\times10^{-4}$ part by weight, preferably $0.01\times10^{-4}$~$0.05\times10^{-4}$ part by Weight based on 100 parts by weight of base polymer for the silicone rubber. Thus, the degradation of core transparency with a lapse of time and at high temperature is effectively prevented, whereby the excellent transparency can be maintained over a long period of time.

When each of the core 4 and the clad 5 is made from the silicone rubber, the adhesion strength between both materials can sufficiently be enhanced, and the optical and mechanical properties of the optical wave guide 1 can be made good and stable over a wide temperature range of from about $-50°$ C. to about $200°$ C.

Moreover, the optical wave guide 1 shown in FIG. 1b is circular in the sectional shape, but may be a polygonal shape such as triangle, rectangle or the like, or a non-circular curved shape such as ellipsoid or the like. And also, the core 4 may be constructed with a bundle of plural linear bodies instead of the single solid body.

In the optical wave guide 1 of the illustrated embodiment, in order that light intruded from the core 4 into the clad 5 on the basis of plastic deformation such as bending, compression or the like is efficiently absorbed to effectively prevent the turning back to the core 4, it is favorable that the outer periphery of the clad 5 is covered with a light absorbing layer composed of a light absorbing material such as carbon black, black pigment, organic or inorganic coloring matter and a natural rubber or a synthetic rubber such as silicone rubber, fluorine rubber, butyl rubber or the like, or that the light absorbing material is dispersed in and mixed with the clad material itself.

Furthermore, in order to improve the water-proofness, oilproofness, weather resistance, mechanical strength and the like of the optical wave guide 1 and, if necessary, the light absorbing layer, it is preferable to airtightly cover the guide or the guide and the layer with natural rubber or synthetic rubber such as butyl rubber, butadiene rubber, urethane rubber or the like, or a plastic material such as vinyl chloride resin or the like.

To one end of the optical wave guide 1 is connected the light emitting means 2 through an optical connector or the like or by adhesion. As the light emitting means 2, use may be made of a luminescent diode, an incandescent lamp, a semiconductor laser and the like, among them, the use of the semiconductor laser is preferable.

As the light receiving means 3 connected to the other end of the optical wave guide 1, there may preferably used a photodiode, a phototransistor and the like.

In the pressure-sensitive sensor of the above structure, when the external force producing bending deformation, compression deformation or other deformation is applied to the optical wave guide 1, since the optical wave sensor 1 can be subjected to a sufficiently large elastic deformation in accordance with the magnitude of the external force, the light quantity emitted from the light emitting means 2 through the optical wave guide 1 to the light receiving means 3 is largerly reduced in accordance with the magnitude of the external force based on the optically elastic effect, whereby the presence of the external force acting to the optical wave guide 1 and the magnitude thereof can be detected at a high sensitivity.

The light arrived at the light receiving means 3 can be converted into a light voltage signal in compliance with the light quantity by a signal processing circuit involved in the light receiving means itself or connected thereto through a lead wire. On the other hand, the driving of the light emitting means 2 can be carried out by a driving circuit involved in the light emitting means 2 itself or connected thereto through a lead wire.

FIG. 2 shows a second embodiment of the pressure-sensitive sensor according to the invention. This pressure-sensitive sensor comprises an optical wave guide 1, a base plate 6 for supporting the optical wave guide 1, a light emitting means 2 and a light receiving means 3 optically connected to both end faces of the optical wave guide 1, lead wires 9, 10 connected to an input terminal 7 of the light emitting means 2 and an output terminal 8 of the light receiving means 3, a cover 11 covering the optical wave sensor 1 as well as the light emitting means 2 and the light receiving means 3, a pair of sealing members 12 covering the connected portions between the input terminal 7 and the lead wire 9 and between the output terminal 8 and the lead wire 10 and sealing openings between the base plate 6 and the cover 11, and a detecting device 13 connected to the lead wires 9, 10.

The base plate 6 is freely selected from various materials extending from rigid material to flexible material in accordance with the use purpose and may be, for example, metal molded articles, plastic molded articles and rubber molded articles. As seen from FIG. 3a showing an enlarged sectional view taken along a line III—III of FIG. 2, the optical wave sensor 1 is sufficiently and stably supported in a groove 6a formed in the widthwise central portion of the base plate 6 through an adhesion or other fitting means.

Figure 3B:
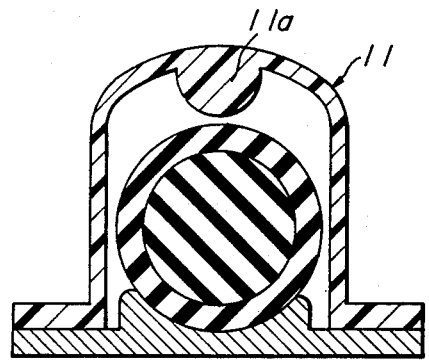
Figure 3C:
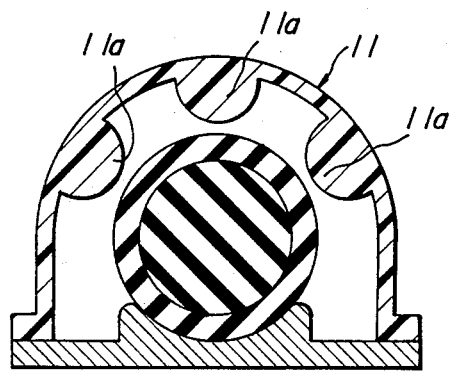

The cover 11 as a protective member for the optical wave guide 1 is preferably made from a rubber material or a plastic material having waterproofness, oilproofness, weather resistance and the like. As shown in FIG. 3a, the cover 11 can be shaped so as to separate the inner surface of the cover from the peripheral face of the optical wave guide 1, particularly the upper half portion thereof at an approximately equal interval. It is a matter of course that a protrusion 11a or a ridge having a curved profile in section may be arranged on the inner surface of the cover 11 at a position corresponding to the top of the optical wave sensor 1 as shown in FIG. 3b, or plural projections 11a or plural ridges may be arranged on the inner surface of the cover 11 in the circumferential direction as shown in FIG. 3c. Particularly, in the embodiments of FIGS. 3b and 3c, when the external force is applied to the cover 11, the optical wave sensor 1 is simply and sufficiently subjected to elastic deformation through the action of the projection 11a or the ridge, so that even when the external force is small, it can surely be detected at a high sensitivity. Furthermore, in the embodiment of FIG. 3c, the detection of external force can be always performed at a high sensitivity irrespective of the acting direction of external force.

Moreover, the sectional profile of the projection 11a or the ridge may be square. In this case, the same action and effect as mentioned above can be obtained.

In FIG. 4 is shown an embodiment of the electric circuit in the detecting device 13, which comprises a driving circuit 14 for the light emitting means 2 such as a luminescent diode and a signal processing circuit 15 for the light receiving means 3 such as a phototransistor.

The driving circuit 14 functions to switch on the light emitting means 2 by controlling a voltage $V_{cc}$ supplied from a direct current power source through a resistor 16. On the other hand, the signal processing circuit 15 connected to the light receiving means 3 through the lead wire 10 functions to generate an output signal only when an optical signal voltage $V_s$ lowers below a reference voltage $V_{ref}$ in accordance with the reduction of light received quantity at the light receiving means 3 by amplifying an optical current generated at the light receiving means 3 through a transistor 17 and an operational amplifier 18 to generate the optical signal voltage $V_s$ and comparing the optical signal voltage $V_s$ with the reference voltage $V_{ref}$ supplied from a variable resistor 20 in a comparator 19.

For example, when the pressure-sensitive sensor of the above structure is applied to a window frame of a power window for a vehicle, if the external force is not applied to the pressure-sensitive sensor, light emitted from the light emitting means 2 is transmitted to the light receiving means 3 through the optical wave guide 1 without reducing the light quantity, so that the optical signal voltage $V_s$ becomes larger than the reference voltage $V_{ref}$ and the comparator 19 does not generate the output signal.

In the closing of the window glass, if there is caused a risk that a part of a body of a passenger interposes between the window frame and the window glass, this body portion produces an external force acting to the pressure-sensitive sensor to form a bending portion in the optical wave guide 1, whereby the light quantity transmitted to the light receiving means 3 is reduced to make the optical signal voltage $V_s$ lower than the reference voltage $V_{ref}$ and consequently the signal is output from the comparator 19. Therefore, the stopping or descending of the window glass is performed based on the output signal, whereby the safety of the passenger is sufficiently ensured.

In addition to the window frame of the power window, the pressure-sensitive sensor is applicable to an inner wall in a room of a bus, surroundings of robot and other movable devices, a fense or the like, whereby the indication of way-out in the bus, stop of robot, automatic carrier car or the like, detection of invader and so on can surely be realized even under the action of slight external force. Since the optical wave guide 1 is made from the rubbery elastic material, even when the pressure-sensitive sensor is used in factories or others, the sensor can always and normally be operated without being subjected to an influence of electromagnetic wave, and even when being used in an ignitable organic solvent, oil, gas atmosphere or the like, there is no fear of ignition, explosion or the like. In any case, the pressure-sensitive sensor can always develop an excellent performance for detection of external force in all-round directions.

Although the pressure-sensitive sensor of the illustrated embodiment generates on-off signal in accordance with the presence or absence of the external, it can quantitatively output or indicate the magnitude of the external force acting to the sensor. Furthermore, the light emitting means 2 and light receiving means 3 are included in the detecting device 13 in the illustrated embodiment, but these light emitting and receiving means 2, 3 may indirectly be connected to the optical wave guide 1 through a plastic optical fiber, quartz optical fiber or the like.

FIG. 5 shows a third embodiment of the pressure-sensitive sensor according to the invention. This sensor comprises an optical wave guide 1, a reflective member 21 joined to one end of the optical wave guide 1, light emitting and receiving means 2 and 3 connected to the other end of optical wave guide 1 through fine optical fibers 22 and 23.

In this embodiment, the optical wave guide 1 is composed of a core 4 made from a rubbery elastomeric material having high light permeability and refractive index and a clad 5 made from a rubbery elastomeric material having a refractive index smaller than that of the core 4 likewise the case of FIG. 1. Furthermore, the core 4 and clad 5 are made from the same material as mentioned above, respectively.

The sectional profile of the optical wave guide 1 in a plane perpendicular to the axial line may properly take circular, square, ellipsoid and others. Furthermore, the core 4 may be constructed with a bundle of plural linear bodies.

As the reflective member 21, use may be made of plates of aluminum, gold, silver and so on, and these plates subjected to evaporation, plating, ion plating and the like in order to efficiently reflect light transmitted in the optical wave guide 1 toward the optical fiber 23 and hence the light receiving means 3. Therefore, in order to effectively improve the reflection efficiency by lessening the scattering loss at the joint face between the optical wave guide 1, particularly the core 4 and the reflective member 21, it is preferable that the end face of at least core 4 is coated with a transparent material having a refractive index approximately equal to that of the core to make the end face of the optical wave guide 1 optically flat. In this case, a liquid synthetic rubber such as liquid silicone rubber, liquid urethane rubber and so on, or a plastic material such as epoxy resin and so on is preferably used as the transparent coating material.

After the reflective member 21 is joined to the one end of the optical wave guide 1, it is favorable to cover the joint portion therebetween and the reflective member 21 with a coating material having excellent waterproofness, oilproofness and weather resistance, e.g. natural rubber, synthetic rubbers such as urethane rubber, butadiene rubber and so on, or plastic material such as polyethylene, nylon, vinyl chloride resin and so on.

As the light emitting means 2, use may be made of a luminescent diode, laser diode, halogen lump, xenon lamp and the like. As the light receiving means 3, use may be made of a phototransistor, a photodiode, a photo electric tube, a photomultiplier and the like. As the optical fibers 22, 23 for connecting the light emitting and receiving means 2, 3 to the optical wave guide 1, use may be made of quartz optical fiber, multicomponent glass series optical fiber, plastic optical fiber, rubber optical wave guide and so on, each having a finer diameter. Particularly, when using the optical fiber having a small numerical aperture, the stray component of incidental light directly transmitted from the optical fiber 22 to the optical fiber 23 can effectively be reduced.

As shown in FIG. 5, the optical connection of the optical fibers 22, 23 to the optical wave guide 1 is carried out by directly inserting these fibers into the core 4, or may be performed by directly joining end faces of these fibers 22, 23 to the end face of the optical wave guide 1 through adhesion or the like, or by mechanically bonding an optical fiber connector mounted on the end portions of these fibers 22, 23 to an optical fiber connector mounted on the end portion of the optical wave guide 1. In the former case, it is preferable that the joint portion is covered with a transparent material such as epoxy resin, silicone rubber or the like to enhance the joining strength and the outer periphery of the joint portion is protected by a protective member made from a metal, a plastic or the like. In the latter case, it is not necessarily required to contact the end faces of the optical fibers 22, 23 with the end face of the optical wave guide 1, so that a space may be arranged between the optical fiber and the optical wave guide by properly designing the numerical aperture, diameter, arrangement size and the like of the optical fibers 22, 23. In this case, silicone oil, silicone compound, silicone rubber or the like may be poured into the space for enhancing the optical matching therebetween.

In this embodiment, the light emitting and receiving means 2, 3 may directly be connected to the optical wave guide 1 without using the optical fibers 22, 23, or the incidental light may be separated from the reflective light by means of a beam splitter. In addition, it is favorable that the outer periphery of the clad 5 is covered, for example, with natural rubber or synthetic rubber such as butadiene rubber, silicone rubber, fluorine rubber, urethane rubber or the like dispersing and mixing carbon black, pigment, organic or inorganic coloring matter therein, or the carbon black, pigment or coloring matter is dispersed and mixed in the clad material 5 itself in order to efficiently absorb the light once intruded from the core 4 into the clad 5 during the bending, compression deformation of the optical wave guide 1 to effectively prevent the turning back to the core 4.

Numeral 24 in FIG. 5 is an outer coating layer for airtightly covering a region of from the outer periphery of the optical wave guide 1 to the reflective member 21, which may be made from a natural rubber, a synthetic rubber such as butyl rubber, butadiene rubber, urethane rubber, fluorine rubber and the like, or a relatively flexible plastic material such as vinyl chloride resin, polyethylene, nylon or the like. The outer coating layer 24 brings about the improved of waterproofness, weather resistance, mechanical strength for the optical wave guide 1 and acts to effectively remove disturbant light. Moreover, the outer coating layer 24 may omit in accordance with the use purpose of the pressure-sensitive sensor.

In the pressure-sensitive sensor of the above structure, the light emitted from the light emitting means 2 and arrived from one end of the optical wave guide 1 to the other end thereof is reflected by the reflective member 21 and incided into the light receiving means 3 through the optical wave guide 1.

When no external force acts to the pressure-sensitive sensor, the light emitted from the light emitting means 2 is reflected by the reflective member 21 with an extremely slight loss, so that the reflected light is turned back to the light receiving means 3 at an approximately light quantity. On the other hand, when the optical wave guide 1 is locally subjected to compression or bending deformation in a direction crossing to the axial line by the external force directly or indirectly applied to the optical wave guide 1, a part of the light emitted from the light emitting means 2 and transmitted inside the optical wave guide 1 intrudes into the clad 5 at the deformed portion and emits toward the outside, and consequently the quantity of light arriving at the light receiving means 3 is reduced Moreover, the elastic deformed portion of the optical wave guide 1 not only causes the emission of light toward the outside but also produces a scattering light directing to all-direction inside the optical wave guide. In this case, however, the scattering light arriving at the light receiving means 3 is a very slight amount, so that the pressure-sensitive sensor can always develop a stable operation.

In this pressure-sensitive sensor, therefore, the magnitude of the external force can quantitatively be detected by detecting a voltage signal in proportion to the light quantity received at the light receiving means 3, and this voltage signal is binalized in comparison to threshold value to perform the switching operation on external force larger than the particular value.

Furthermore, the pressure-sensitive sensor can surely and sufficiently prevent not only the breakage, plastic deformation and the like of the optical wave guide 1 but also the peeling of the light emitting and receiving means from the optical wave guide. Moreover, since the light emitting and receiving means 2, 3 can be arranged aside in one end portion of the optical wave guide 1, they can be operated by a single driving device without using longer lead wire and optical fiber, so that the structure of the pressure-sensitive sensor can be simplified and made sufficiently compact.

FIG. 6 sectionally shows a modified embodiment of FIG. 5. In this case, the pressure-sensitive sensor is constructed by joining a lens 25 made from inorganic glass, plastic transparent rubber or the like to an end face of the optical wave guide 1 opposed to the connecting end face to the light emitting and receiving means 2, 3, arranging the reflective member 21 at a position separated away from the lens 25 and covering a region from the end portion of the outer coating layer 24 to the reflective member 21 with a protective cap 26 made from a metal, plastic or the like.

Moreover, a transparent filler can be filled in a space defined between the lens 25 and the reflective member 21.

And also, the reflective member 21 can be arranged in contact with the lens 25. A graded index type rod lens as a light convergent optical element can be used instead of the lens 25.

In FIGS. 7a and 7b is shown a embodiment of applying the pressure-sensitive sensor according to the invention to a mat switch. That is, the optical wave guide 1 is laid on a lower mat 27 in zigzag form and secured thereto through an adhesion or the like, while the light emitting and receiving means 2, 3 are directly connected to the ends of the optical wave guide 1 on one hand and to the detecting device 13 through the lead wires 9, 10 on the other hand. Furthermore, an upper mat 29 is attached to the lower mat 27 through a frame-like spacer 28 fixed to the peripheral portion of the lower mat 27.

The lower mat 27 may be made from any rigid or flexible material and may properly be selected, for example, from metals, plastics, rubbers and foamed plastics in accordance with the use purpose. Furthermore, the frame-like spacer 28 fixed to the lower mat 27 through the adhesion or the like to surround the optical wave guide 1 may be made from the same material as in the lower mat 27 and has preferably a thickness equal to or somewhat larger than that of the optical wave guide 1.

The upper mat 29 is preferably made from a flexible material such as rubber, flexible vinyl chloride resin, thermoplastic rubber or the like and is provided at the inner face facing the optical wave guide 1 with unevennesses as shown in FIG. 7b. Moreover, even when the inner face of the upper mat 29 is not provided with the unevenness, this mat can sufficiently effectively transmit the external force to the optical wave guide 1 based on the elastic deformation of the mat itself.

In this mat switch, it is necessary to lay the optical wave guide 1 on the lower mat 27 so as not to produce radiation loss of light at the curved portion of the optical wave guide 1 in connection with the size of the guide 1, refractive indexes of the core and clad and the like. For example, when the core diameter is 2 mm, the refractive indexes of the core and clad are 1.50 and 1.40, respectively, the radius of curvature of the optical wave guide 1 is not less than 20 mm.

Moreover, a flexible sheet made from a flexible foam, a flexible rubber, a foamed rubber or the like may be interposed between the lower mat 27 and the optical wave guide 1, whereby the sensitivity of detecting external force by the optical wave guide 1 can advantageously be enhanced.

Figure 8:
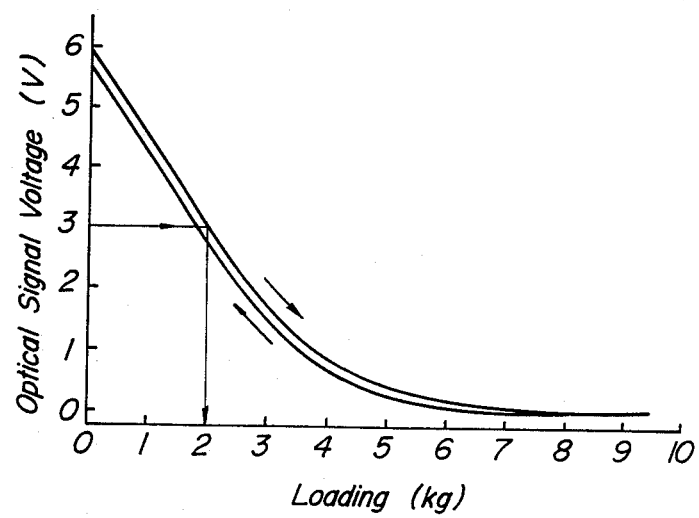
FIG. 8 is a graph showing a relation between load and optical signal voltage in the mat switch of FIG. 7.

In FIG. 8 is shown a relation between magnitude of external force acting to the mat switch of the above structure and optical signal voltage detected by the detecting device 13 per a square of 100 mm, from which it is apparent that the optical signal voltage proportionally decreases as the loading increases and finally saturates against external force above the certain value.

For instance, when a reference voltage is 3 V of the optical signal voltage, the detecting device 13 can generate a detecting signal against only the external force having a magnitude of not less than 2 kg. In the mat switch, the detecting sensitivity can properly be adjusted to the magnitude of external force within a range of several hundred grams to several kilograms by changing the reference voltage into various values.

Therefore, this mat switch hardly affects an influence of electromagnetic wave, surely and stably operates in water or in an ignitable or explosive atmosphere and can control the sensitivity. For this end, such a mat switch can function not only as a safety switch causing the stop of the driving device, the occurrence of alarm or the like against the invasion of person into a danger zone by disposing around the driving device for robot, NC machining tools, pressing machines and the like but also as an on-off switch for automatic door, a switch for confirmation of seating in automobile or the like, or a touch plate for swimming meet.

Although the above embodiment is described whether or not the external force is detected by the detecting device 13 to be larger than the certain value, when the magnitude of external force is quantitatively judged by the detecting device, the mat switch may be used as a sensor for detecting weight of vehicle or the like, a sensor for detecting total passenger weight in an elevator and the like.

In FIGS. 9a and 9b is shown a modified embodiment of the mat switch of FIG. 7, wherein a one-piece type light emitting and receiving means 30 is connected to one end of the optical wave guide 1 zigzagedly laid on the lower mat 27 on one hand and to the detecting device 13 through the lead wires 9, 10 on the other hand, and an aluminum reflective plate 21 is disposed on the other end of the optical wave guide 1.

In this case, the core 4 of the optical wave guide 1 may be made of an addition reaction type phenylmethyl silicone rubber having a content of phenyl group of 25%, while the clad 5 thereof may be made of dimethyl silicone rubber. Furthermore, the lower mat 27, spacer 28 and upper mat 29 may be made from the same material as described above.

As the one-piece type light emitting and receiving means 30, there may be used one having a structure similar to that of a reflection type optical sensor including light emitting and receiving elements and using as a bar code reader or the like. Moreover, the light emitting and receiving means 30 can be connected to the optical wave guide 1 through a fine optical fiber.

Since the optical wave guide in such a mat switch has substantially the same function as in the optical wave guide 1 shown in FIGS. 5 and 6, when the external force acts to the optical wave guide 1 through the upper mat 29, the quantity of light incided from the light emitting means into the inside of the optical wave guide and turned back to the light receiving means through the reflective plate 21 reduces in accordance with the magnitude of the external force, so that the presence and magnitude of the external force can be detected by measuring the change of the light quantity.

This illustrated mat switch is applied to the same applications as mentioned above and achieves the same function and effect as mentioned above. Furthermore, the structure is simplified as compared with the aforementioned embodiment, so that the whole of the pressure-sensitive sensor can sufficiently be miniaturized.

FIG. 10 sectionally shows an embodiment of applying the pressure-sensitive sensor according to the invention to a bumper for automobile. In this bumper, a cushioning member 32 is attached to a front face of a support base 31 made of a metal or other rigid material through adhesion or the like, while the optical wave guide 1 is arranged along the peripheral face of the cushioning member 32. The light emitting means 2 and light receiving mean 3 connected to both ends of the optical wave guide 1 are connected to the detecting device (not shown) through the lead wires 9, 10, and further the optical wave guide 1 and light emitting and receiving means 2, 3 are covered with a covering member 33.

As the support base 31, use may be made of metal, plastics, wood or the like. As the cushioning member 32, use may be made of foamed materials such as urethane foam and the like, natural rubber, and synthetic rubbers such as silicone rubber, butadiene rubber, urethane rubber and the like.

The optical wave guide 1 attached to the peripheral face of the cushioning member 32 as a whole may be covered with a rubber material, a plastic material or the like having excellent waterproofness and impact resistance. The joint portion between the light emitting means 2 (luminescent diode) or the light receiving means 3 (phototransistor) and the optical wave guide 1 is preferably covered with a material having insulative properties and waterproofness such as silicone rubber, epoxy resin or the like.

Moreover, the covering member 33 may be constructed with a material properly selected from plastic materials such as vinyl chloride resin and so on, natural rubber and synthetic rubbers.

When such a bumper is applied, for example, to an automatic guided vehicle or a forklift truck, if the bumper comes into contact with or collides with a structural body or other working vehicle, the optical wave guide 1 is subjected to bending or other deformation at a position exposed to external force and consequently the quantity of light emitted from the light emitting means 2 and arrived at the light receiving means 3 through the optical wave guide 1 is reduced, which is detected by the detecting device. Then, on-off signal in compliance with the received light quantity is output from the detecting device, whereby the stop or backward moving of the automatic guided vehicle or forklift truck is performed or the occurrence of abnormal situation can be informed to an operator for the forklift truck or the like through a buzzer or an alarm lump.

In FIG. 11 is sectionally shown another embodiment of applying the pressure-sensitive sensor according to the invention to a bumper, wherein the pressure-sensitive sensor attached to the peripheral face of the cushioning member 32 comprises an optical wave guide 1, a one-piece type light emitting and receiving means 30 connected to one end of the optical wave guide 1, a reflective plate 21 attached to the other end of the optical wave guide 1 and a detecting device 13 connecting to the light emitting and receiving means 30 through lead wires 9, 10.

The detecting device 13 is provided with at least glow circuit for luminescent element and driving and signal processing circuit for light receiving element.

Such a bumper can develop the same function and effect under the same applying conditions as mentioned in the previous bumper except that the light arrived at the reflective member 21 is reflected toward the light receiving element in the light emitting and receiving means 30.

Moreover, since the light emitting and receiving means 30 in this bumper is one-piece type, it is a merit that the lead wires 9, 10 can be drawn only from one end of the bumper in view of the structure.

Figure 12:
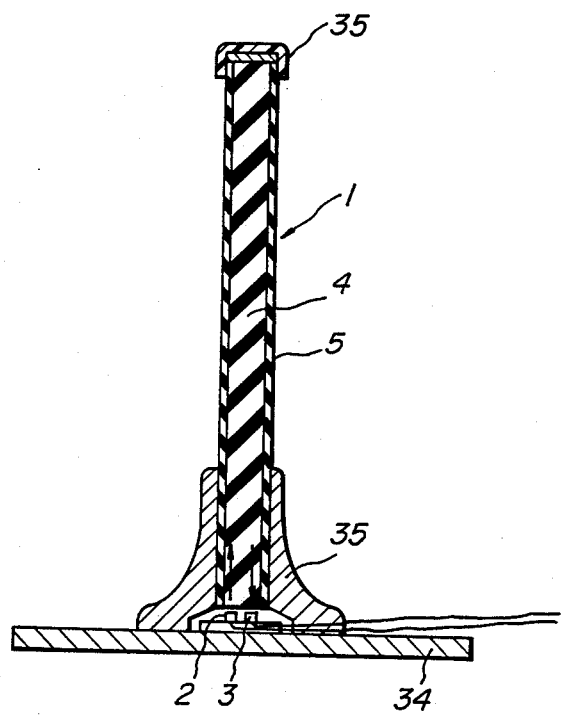
FIG. 12 is a sectional view of the other embodiment of applying the pressure-sensitive sensor according to the invention.

FIG. 12 shows an embodiment of reflection type pressure-sensitive sensor, wherein the optical wave guide 1 is stood upward on a base plate 34 through a holder 35, and a light emitting means 2 and a light receiving means 3 are attached to the lower end of the optical wave guide 1, and a reflective plate 21 is attached to the upper end of the guide 1, and the attached portion of the reflective plate 21 to the optical wave guide 1 is airtightly covered with a protective cap 35 made of a metal, a plastic material or a rubber material.

In this sensor structure, the presence and magnitude of external force can be detected at a high sensitivity based on the presence or absence of bending deformation of the optical wave guide 1, so that when it is applied to, for example, a vehicle, an automatic guided vehicle, forklift truck or the like, the contact with an object can surely be detected. Further, when the bumper is attached to a conveying device such as a conveyor or the like, the passage of an object to be conveyed can exactly be detected.

The method of producing a flexible optical wave guide according to the second aspect of the invention will be described with reference to the following illustrated embodiments.

Figure 13:
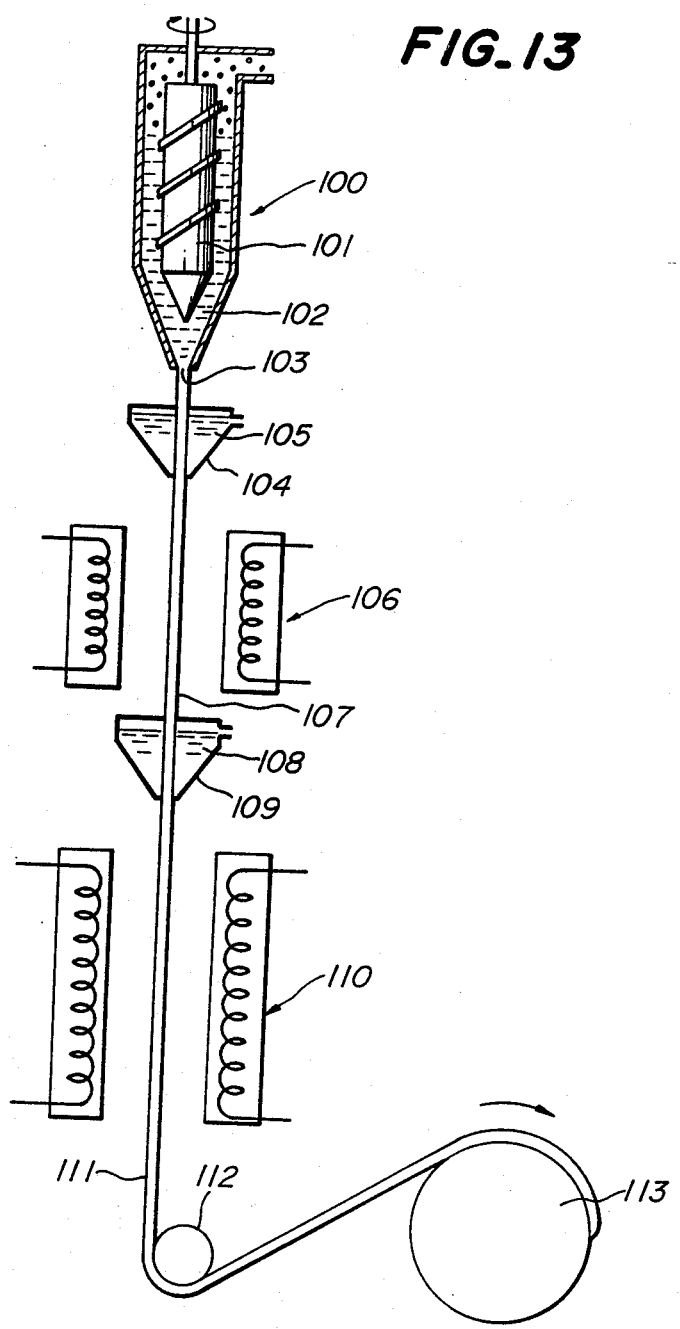
FIG. 13 is a schematic view of an embodiment of the apparatus for producing the flexible optical wave guide according to the invention.

FIG. 13 shows a first embodiment of the apparatus for producing the flexible optical wave guide according to the invention, wherein numeral 100 is an extrusion apparatus serving to extrude a transparent core material 102 downward through a nozzle 103 based o rotational movement of a screw 101.

The transparent core material 102 extruded from the nozzle 103 is preferable to have a high viscosity to an extent of causing no fluidization, deformation or the like until the curing in order that the core material 103 is maintained at given size and shape. For this purpose, when the viscosity is converted into a plasticity, the core material is favorable to have a Williams plasticity of 50~1,000.

As the transparent core material 102, use may be made of synthetic rubbers such as chloroprene rubber, urethane rubber, silicone rubber, acrylic rubber, fluorine rubber, ethylene-propylene rubber, ethylene-propylene-diene terpolymer rubber, epichlorohydrin rubber and so on.

The transparent core material 102 extruded from the nozzle 103 is passed through a first coating tank 104, during which a low viscosity transparent liquid coating material 105 reserved in the coating tank 104 is applied to the transparent core material 102. Then, the coated core material is passed through a first heating furnace 106, at where the transparent core material 102 and the transparent coating material 105 are sufficiently and homogeneously cured in a radial direction at a relatively low temperature.

Thus, the unevenness formed on the peripheral surface of the transparent core material 102 by the nozzle 103 can completely be made up with the coating material 105, and also the outer surface of the coating material 105 can be made optically sufficiently smooth by the rapid curing.

The low viscosity transparent liquid coating material 105 is favorable to have such a refractive index that the difference in the refractive index between the materials 102 and 105 is not more than 0.01. Particularly, the coating material 105 is the same as the core material 102 and is preferable to have a polymerization degree lower than that of the core material 102.

As the coating material 105, use may be made of liquid synthetic rubbers having a viscosity of 1~200 P such as chloroprene rubber, butadiene rubber, isoprene rubber, urethane rubber, silicone rubber, acrylic rubber, ethylene-propylene rubber, ethylene-propylene-diene terpolymer rubber, epichlorohydrin rubber and so on.

For example, when silicone rubber having a content of phenyl group of 5~35% and a Williams plasticity of 50~1,000 such as dimethyldiphenyl polysiloxane or phenylmethyl polysiloxane is used as the high viscosity transparent core material 102, the low viscosity transparent coating material 105 is selected from liquid silicone rubbers of dimethyldiphenyl polysiloxane and phenylmethyl polysiloxane having a viscosity of 1~200 P and a content of phenyl group equal to that of the core material 102, whereby a cured structural body 107 composed of the core material 102 and the coating material 105 having the same refractive index and excellent transparency and heat resistance is obtained.

In this case, if the curing mechanism of silicone rubber as the core material 102 is an addition type, the amount of the curing catalyst used can be made slight, so that the amount of the reaction by-product is slight and the transparency of the structural body 107 is considerably improved.

The application of the coating material 105 to the core material 102 is carried out before the curing of the core material 102 as shown in FIG. 13, but may be carried out after the curing of the core material. However, the application method shown in FIG. 13 is preferable in order to improve the adhesion strength between the core material and the coating material. Furthermore, a heating furnace such as electric furnace, hot air furnace, hot vapor furnace, hot liquid bath or the like as well as an irradiation device of ultraviolet ray, radiation, electron beam or the like may be used as a heating means for the curing.

The cured structural body 107 made from the core material 102 and the coating material 105 is passed through a second coating tank 109 reserving a clad material 108, at where the clad material 108 is applied to the peripheral surface of the structural body, particularly the coating material 105, and then passed through a second heating furnace 110 to conduct the curing of the clad material 108, whereby a transparent rubbery elastomeric body having a high refractive index, or a so-called flexible optical wave guide 111 consisting of the cured structural body 107 as a core and the low refractive index rubbery elastomer as a clad is produced.

The thus produced flexible optical wave guide 111 is wound on a take-up drum 113 through a guide roller 112.

In this way, the clad material 108 is applied to the optically sufficiently smooth outer surface of the coating material 105 at a state exactly corresponding to this outer surface and then cured, so that the optical transmission loss resulted from the unevenness at the boundary face between the cured structural body 107 and the clad material 108 can effectively be prevented in the resulting optical wave guide.

As the clad material 108 forming a clad by curing, use may be made of a liquid rubber having a refractive index lower than that of the cured structural body 107 selected from the group consisting of liquid silicone rubber, liquid fluorine rubber, liquid butadiene rubber, liquid ethylenepropylene rubber and the like. Among them, when using addition reaction type dimethyl polysiloxane or ultraviolet ray curing type dimethyl siloxane, the curing time can be shortened to enhance the coating rate. In this case, when the cured structural body, particularly transparent coating material 105 is made of silicone rubber, the adhesion force between the structural body 107 and the clad material 108 is increased to provide an optical wave guide having excellent mechanical strengths.

In the application of the clad material 108, when the structural body 107 is completely cured, there is a fear that the structural body and the clad material are not sufficiently bonded to each other by the curing in accordance with the material used because it is generally difficult to bond the cured rubber to uncured rubber. On the other hand, when the adhesive is interposed therebetween, the adhesive layer degrades the optical properties of the optical wave guide. Therefore, it is preferable to determine the length and temperature of the first heating furnace 106 and the extrusion rate of the core material 102 so as to maintain the structural body 107 at a semi-cured state and then apply the clad material 108 to the semi-cured structural body.

Moreover, it is possible to cover the outer surface of the clad material 108 with a primary coat material, a buffer coat material, a covering material or the like for protection and buffering against mechanical shock, removal of stray light and the like.

The light permeability test of the flexible optical wave guide produced by the method according to the invention will be described below.

An addition reaction type phenylmethyl silicone green rubber (content of phenyl group: 25%, polymerization degree: about 5,000) as a core material was extruded through a nozzle of 1.8 mm in diameter at a rate of 5 m/min, to which was applied a coating material of addition reaction type phenylmethyl silicone rubber (content of phenyl group: 25%, viscosity: 30 P) and then cured in a heating furnace of 10 m in length (temperature: 200° C.) to from a cured structural body composed of the core material and the coating material. Then, a clad material of addition reaction type dimethyl silicone rubber (viscosity: 30 P) was applied to the cured structural body, which was cured in a heating furnace of 1.2 m in length at a temperature of 200° C. to produce a flexible optical wave guide.

The thus obtained optical wave guide had a diameter of 2.2 mm and a daylight permeability of 90% per 1 m.

Alternatively, the flexible optical wave guide used in the pressure-sensitive sensor according to the invention may be produced by first producing a clad tube comprising a flexible hollow tube body and an intermediate layer formed on the inner surface of the hollow tube body, pouring a liquid core material having a refractive index larger than that of the intermediate layer and then curing it through heating or irradiation of radiation or ultraviolet ray.

The clad tube is preferably produced by introducing a coating liquid into the inside of the hollow tube body from at least one end thereof to form a pool of the coating liquid therein, pulling the one end portion of the hollow tube body upward while holding the pool of the coating liquid to apply the coating liquid to the inner surface of the hollow tube body, and then rapidly curing the coating liquid adhered to the inner peripheral surface of the hollow tube body to form the intermediate layer.

In this method, either one end portion of the hollow tube body pulled upward and wound on a take-up drum while holding the pool of the coating liquid, whereby the coating liquid is evenly and uniformly applied to the inner peripheral surface of the hollow tube body based on the relative movement between the hollow tube body and the pool. This can be continued as far as the pool is existent inside the tube body, so that the coating liquid is sufficiently smoothly and continuously applied to the inner peripheral surface of the elongated hollow tube body at a uniform thickness without causing surface unevenness due to sagging or the like.

The thus applied coating liquid is rapidly cured by a curing device preferably arranged at a position just above the application step to form the intermediate layer, so that there is not caused a fear of flowing and sagging the coating liquid with a lapse of time from the application of the coating liquid to the curing thereof.

Therefore, the intermediate layer having a very smooth inner surface can be formed in the elongated flexible optical wave guide at a uniform thickness in the circumferential and lengthwise directions, whereby the transmission properties of the optical wave guide can considerably be improved.

Figure 14:
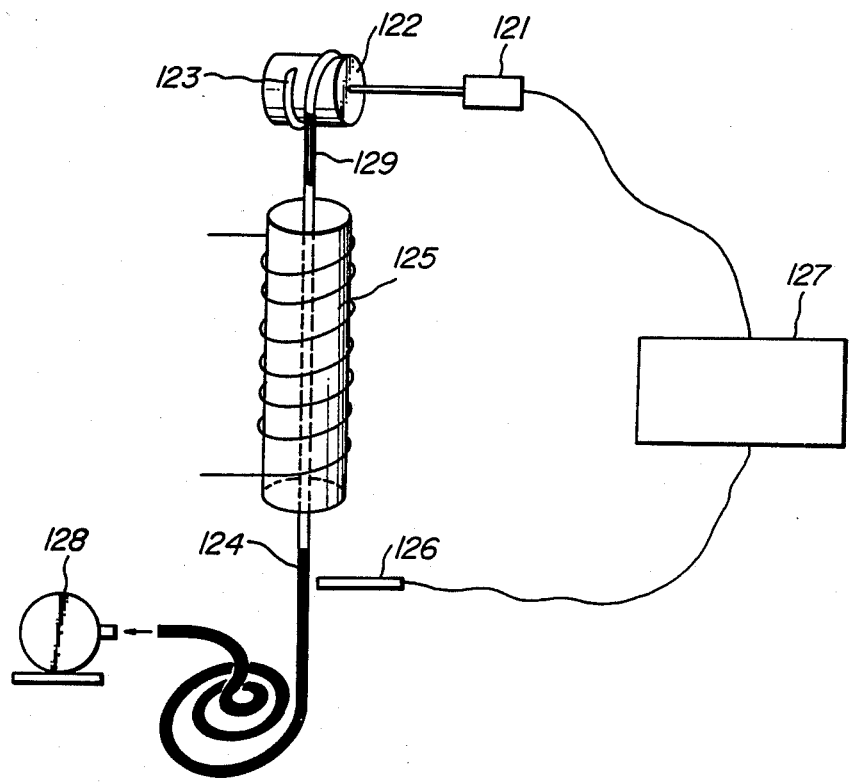
FIG. 14 is a schematic view of another embodiment of the apparatus for producing the flexible optical wave guide according to the invention.

FIG. 14 shows an embodiment of the apparatus practising the above method, which comprises a winding motor 121, a take-up drum 122 driven by the motor 121, a heating furnace or an ultraviolet ray or radiation irradiation means 125, particularly heating furnace 125 in the illustrated embodiment for crosslinking and curing a coating liquid 124 applied to an inner peripheral surface of a hollow tube body 123, a liquid level sensor 126 for detecting pool level of the coating liquid 124 inside the hollow tube body 123, and a controller 127 for controlling the operation of the motor 121 based on a signal output from the liquid level sensor 126. If necessary, the apparatus further comprises a vacuum pump 128 connecting to the end portion of the hollow tube body 123.

In the operation of this apparatus, the coating liquid 124 is introduced into the inside of the hollow tube body 123 from at least one end thereof to form a pool of the coating liquid 124 in the hollow tube body 123, while the other end portion of the hollow tube body 123 or a lead lope connected thereto is wound on the take-up drum 122 through the heating furnace 125.

Moreover, the term "pool" used herein means a state that the coating liquid 124 is locally existent in the middle portion of the hollow tube body 123 and a state that the coating liquid is fully filled in a region ranging from the middle portion of the hollow tube body 123 to the end portion thereof opposite to the end facing the take-up drum.

The flexible hollow tube body may be made from a synthetic resin material such as polyethylene, polypropylene, vinyl chloride resin, nylon resin and so on, a rubber material such as natural rubber, butadiene rubber, isoprene rubber, styrene-butadiene rubber, butyl rubber, silicone rubber, fluorine rubber and so on or a blend thereof. Among them, when using the rubber material, excellent flexibility and stretchability can be given to the optical wave guide together with the core material as mentioned below.

As the coating liquid 124, use may preferably be made of liquid dimethyl silicone rubber, liquid fluorine rubber and fluorine containing liquid silicone rubber such as liquid polymethyltrifluoropropyl siloxane, liquid polymethyltetrahydro perfluorooctyl siloxane or the like. The curing mechanism of this liquid rubber may be selected from peroxide curing, curing through addition reaction or condensation reaction, curing through electron beam, radiation or ultraviolet ray and so on. Particularly, when using the addition reaction type silicone rubber, the reaction by-product is hardly produced, so that the intermediate layer having excellent properties can be obtained.

The amount of the coating liquid 124 poured into the hollow tube body 123 is preferable to be determined by the length and inner diameter of the hollow tube 123, the viscosity of the coating liquid, the coating speed and the like.

As shown in FIG. 15a, when the pool level of the coating liquid 124 locates at a position higher than the position of the liquid level sensor 126, the hollow tube body 123 is wound on the take-up drum 122 by driving the winding motor 121, whereby the application of the coating liquid 124 to the inner peripheral surface of the hollow tube body is started.

In this case, the pool of the coating liquid 124 falls down relative to the hollow tube body 123 owing to its dead-weight or under an action of a vacuum suction force generated by the driving of the vacuum pump 128, so that the absolute pool level gradually lowers at an initial stage of the application being a relatively low application speed and finally arrives at a position below the liquid level sensor 126 as shown in FIG. 15b.

When the state of FIG. 15b is detected by the liquid level sensor 126, a detecting signal output from the sensor 126 is input into a controller 127, whereby the rotation speed of the winding motor 121 is controlled so as to wind the hollow tube body 123 at a predetermined constant speed. Thus, the scattering of application start timing and other conditions can be completely absorbed to perform the winding of the hollow tube body at a predetermined speed, and consequently the pool level reaches to a position higher by a predetermined height than the position of the liquid level sensor 126 at such a predetermined speed state as shown in FIG. 15c.

The liquid level sensor 126 used herein is an optical sensor when the hollow tube body 123 is transparent or a supersonic or dielectric sensor when it is opaque.

The applied coating liquid 124 is rapidly cured into an intermediate layer 129 when the hollow tube body 123 is passed through the heating furnace 125 disposed just above the liquid level sensor 126.

Therefore, the intermediate layer 129 is continuously and very efficiently formed in the elongated hollow tube body 123. On the other hand, the pool of the coating liquid 124 equally comes into contact with the inner peripheral surface of the hollow tube body 123 in the circumferential and lengthwise directions, so that the coating liquid can be applied at a uniform thickness without causing unevenness in both directions.

Moreover, the applied coating liquid is immediately cured before the occurrence of flowing and sagging, so that the resulting intermediate layer 129 has a uniform thickness over the whole and the inner surface thereof is sufficiently smooth.

Into the inside of the thus obtained clad tube is poured a liquid core material having a refractive index larger than that of the coating liquid, which is then cured by heating or through irradiation of radiation or ultraviolet ray, whereby a flexible optical wave guide can be obtained.

As the core material to be poured into the clad tube, use may be made of liquid rubbers such as liquid polyurethane, liquid acrylic rubber, liquid ethylene-propylene rubber, liquid ethylene-propylene-diene terpolymer, liquid epichlorohydrin rubber, liquid silicone rubber and so on. Particularly, when using methylalkyl polysiloxane containing an alkyl group such as phenyl group, naphthyl group, ethyl group, propyl group, amyl group, butyl group, hexyl group, octyl group, decyl group, naphthaleneethyl group or the like, the refractive index can be freely controlled and also the transparency can easily be enhanced. Further, when the curing mechanism of such silicone rubber is addition reaction type, the amount of the curing catalyst used becomes slight and the reaction by-product is hardly produced, so that the transparency of the core material can further be enhanced.

Moreover, the drawing up of the hollow tube body can be carried out by arranging two liquid level sensors and controlling the rotation of the winding motor so as to place the pool level of the coating liquid in a middle position between these liquid level sensors. And also, as far as the pool of the coating liquid is maintained, after the pool level reaches to a given downward position, the hollow tube body can intermittently be wound on the drum.

When the pool of the coating liquid is formed in the hollow tube body, the coating liquid can be intruded into the hollow tube body by immersing the whole length or only one end portion of the hollow tube body in the coating liquid and ventilating air from the hollow tube body. Therefore, the term "introduction of coating liquid" means to include the case of intruding the coating liquid in addition to the pouring of the coating liquid.

Further, the flexible optical wave guide used in the pressure-sensitive sensor according to the invention can be produced by simultaneously extruding liquid core material and liquid clad material through concentrically arranged nozzles, crosslinking the clad material through irradiation of radiation, electron beam or ultraviolet ray, and curing the core material through heating.

According to this method, the clad material is first rapidly crosslinked through the irradiated ray just beneath the concentric nozzles, so that the mixing between the core material and the clad material and the disorder at the boundary face therebetween are sufficiently prevented and the outer diameter of the optical wave guide is specified to a particular value as expected.

Therefore, the boundary face between the core and the clad is sufficiently made smooth to effectively reduce the optical scattering loss, while the size of the optical wave guide is controlled easily and surely.

Moreover, according to the above method, the thermal degradation of the core can be prevented by curing the core material through the heating at a relatively low temperature and also the core material can be cured sufficiently homogeneously and completely over a whole in the radial direction, so that it is needless to incorporate a sensitizer for absorption of irradiated ray into the core material and consequently the increase of optical scattering loss due to the addition of the sensitizer can be completely removed.

Figure 16:
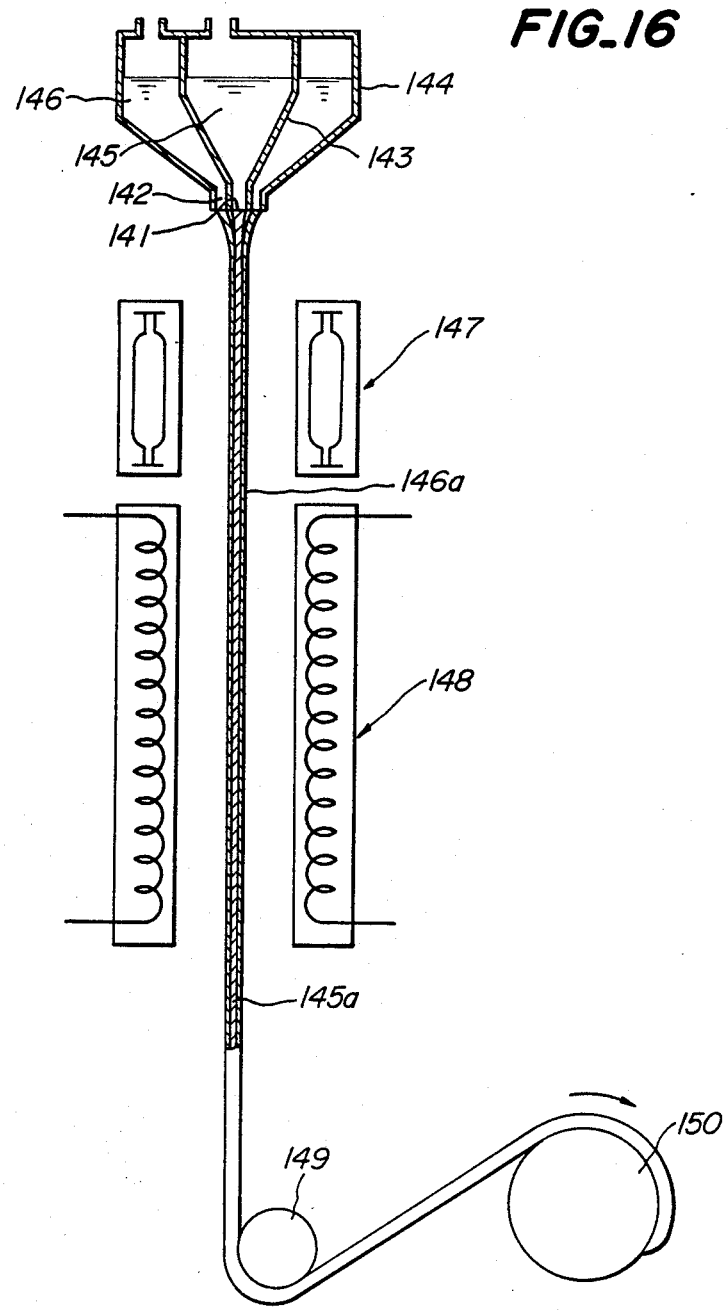
FIG. 16 is a schematic view of the other embodiment of the apparatus for producing the optical wave guide according to the invention.

FIG. 16 shows an embodiment of a main part of the apparatus for practising the above method, wherein numerals 141 and 142 are concentrically arranged nozzles, numerals 143 and 144 inner and outer reservoirs continuing to the nozzles 141 and 142, respectively.

A liquid core material 145 is reserved in the inner reservoir 143, while a liquid clad material 146 is reserved in the outer reservoir 144. The both liquid materials 145 and 146 are simultaneously extruded through the nozzles 141 and 142 under a pressure or though their dead-weights. The extruded clad material 146 as an outer layer is rapidly crosslinked through an ultraviolet ray emitted from a mercury lamp 147 arranged beneath the nozzles 141 and 142 at a position of making the outer diameter of the clad material uniform and then the core material 145 inscribed with the clad material 146, exactly the core material 145 inscribed with a clad 146a obtained by the crosslinking of the clad material 146 is cured at a relatively low temperature in a heating furnace 148 arranged beneath the mercury lamp 147 to form a core 145a of high refractive index rubbery elastomer, whereby a flexible optical wave guide comprising low refractive index rubbery elastomer as a clad 146a is produced. Then, the thus obtained flexible optical wave guide is wound around a take-up drum 150 through a guide roller 149.

As the core material 145 producing a crosslinking reaction by heating, liquid rubbers such as liquid silicone rubber, liquid polyurethane rubber, liquid butadiene rubber and so on are preferable. As the clad material 146 producing a crosslinking reaction through irradiation of ultraviolet ray, radiation or electron beam, liquid rubbers such as liquid silicone rubber, liquid polyurethane rubber, liquid fluorine rubber and so on are preferable.

When an addition reaction type liquid silicone rubber mainly composed of dimethyldiphenyl polysiloxane or phenylmethyl polysiloxane having a content of phenyl group of 5~35% is used as the core material 145 and ultraviolet ray crosslinking type liquid silicone rubber mainly composed of dimethyl polysiloxane is used as the clad material 146, the production rate of the flexible optical wave guide can sufficiently be increased because the crosslinking rate of the clad material 146 is very fast, and also the bonding force between the core 145a and the clad 146a can be increased to produce flexible optical wave guides having stable mechanical and optical properties over a wide temperature range of from low temperature region to high temperature region.

According to this method, the clad material 146 is rapidly crosslinked into the clad 146a before the mixing with the core material 145 and the occurrence of disorder at the boundary face between both materials 145 and 146, and also the resulting clad is introduced into the heating furnace 148 with holding its shaped form, so that the optical scattering loss can be reduced very effectively, and the size of the optical wave guide can easily be controlled to surely realize a size as expected and sufficiently prevent the scattering of the size.

Furthermore, the core material 145 is cured into a sufficiently homogeneous core 145a by heating at a relatively low temperature in the heating furnace 148 without needing the incorporation of a sensitizer for absorption of irradiated ray into the core material, so that the thermal degradation of the core 145a due to the high temperature heating, unhomogeneous crosslinking reaction and the like can effectively be prevented, whereby the optical scattering loss can also be reduced advantageously.

Of course, a device for irradiating radiation or a device for irradiating an electron beam may be used instead of the mercury lamp 147 as a means for crosslinking the clad material 146. Furthermore, any one of these crosslinking means may be integrally united with the heating furnace 148.

When the crosslinking means for the clad material 146 is integrally united with the heating furnace 148, it is favorable to cool the crosslinking means, or to provide heat insulation therebetween. Furthermore, it is preferable to introduce the irradiated ray from the crosslinking means into the furnace through a quartz fiber or other optical fiber.

Although this illustrated embodiment shows the production of flexible optical wave guide composed only of the core 145a and the clad 146a, a coating step using a primary coat material, a buffer coat material, a cover material or the like may be performed before or after the stage using the heating furnace 148. In the latter case, it is preferable to arrange a curing furnace after the coating step.

As mentioned above, according to the invention, the optical wave guide can be subjected to a very flexibly and largely elastic deformation in all directions, so that there is caused no breakage and plastic deformation of the optical wave guide and peeling of the light emitting and receiving means from the optical wave guide, and the presence and magnitude of external force can be detected at a very high sensitivity, and the heat resistance, weather resistance and impact resistance can considerably be improved.

Furthermore, since the optical wave guide is composed of the rubbery elastomer, not only the repetitive fatigue can sufficiently be reduced, but also the troubles by electromagnetic wave can effectively be prevented, and further the explosion proofness, weight reduction and miniaturization of the device can be achieved.

What is claimed is:

1. A pressure-sensitive sensor comprising an optical wave guide composed of core and clad each made from an elastomeric material, and a light emitting means and a light receiving means each connected to said optical wave guide, said core being transparent and having a refractive index somewhat larger than that of said clad material and being made from a synthetic rubber selected from the group consisting of chloroprene rubber, urethane rubber, silicone rubber, fluorine rubber, acrylic rubber, ethylene-propylene rubber, ethylene-propylene-diene terpolymer rubber and epichlorohydrin rubber.

2. The pressure-sensitive sensor according to claim 1, wherein said core material is an alkyl group containing polyorganosiloxane and said clad material is selected from polydimethylsiloxane, fluorine containing polyorganosiloxane and alkyl group containing polyorganosiloxane.

3. The pressure-sensitive sensor according to claim 2, wherein said core material is methylphenyl polysiloxane or dimethylphenyl polysiloxane having a content of phenyl group of 5~40% and a refractive index of 1.42~1.54 and said clad material is dimethyl polysiloxane having a refractive index of 1.40.

4. The pressure-sensitive sensor according to claim 1, wherein said light emitting means is selected from a luminescent diode, an incandescent lap and a semiconductor laser.

5. The pressure-sensitive sensor according to claim 1, wherein said light receiving means is a photodiode or a phototransistor.

6. The pressure-sensitive sensor according to claim 1, wherein said optical wave guide is provided at its one end with a reflective member.

* * * * *